(12) United States Patent
Nishijima et al.

(10) Patent No.: US 6,471,239 B1
(45) Date of Patent: Oct. 29, 2002

(54) AIR BAG DEVICE

(75) Inventors: Kazuyoshi Nishijima; Kazuhiro Kaneko; Tsuyoshi Watanabe, all of Shizuoka (JP)

(73) Assignee: Nihon Plast Co., Ltd., Fuji (JP)

( * ) Notice: Subject to any disclaimer, the term of this patent is extended or adjusted under 35 U.S.C. 154(b) by 0 days.

(21) Appl. No.: 09/667,099

(22) Filed: Sep. 21, 2000

(30) Foreign Application Priority Data

Sep. 30, 1999 (JP) .......................................... 11-280790

(51) Int. Cl.⁷ ............................................. B60R 21/24
(52) U.S. Cl. ...................... 280/729; 280/739; 280/742
(58) Field of Search ................................. 280/731, 729, 280/740, 742, 743.1, 743.2, 739

(56) References Cited

U.S. PATENT DOCUMENTS

| | | | | |
|---|---|---|---|---|
| 5,249,824 A | * | 10/1993 | Swann et al. | 280/729 |
| 5,338,061 A | * | 8/1994 | Nelson et al. | 280/729 |
| 5,560,649 A | * | 10/1996 | Saderholm et al. | 280/743.1 |
| 5,573,270 A | | 11/1996 | Sogi et al. | 280/740 |
| 5,836,608 A | * | 11/1998 | Soderquist et al. | 280/728.2 |
| 5,957,485 A | * | 9/1999 | Hirai | 280/729 |
| 6,059,312 A | * | 5/2000 | Staub et al. | 280/729 |
| 6,224,101 B1 | * | 5/2001 | Nishijima et al. | 280/743.2 |
| 6,254,121 B1 | * | 7/2001 | Fowler et al. | 280/729 |

FOREIGN PATENT DOCUMENTS

| | | | |
|---|---|---|---|
| GB | 2323569 | * | 9/1998 |
| JP | 7-149199 | | 6/1995 |

* cited by examiner

Primary Examiner—Paul N. Dickson
Assistant Examiner—David R. Dunn
(74) Attorney, Agent, or Firm—Foley & Lardner (57) ABSTRACT

An air bag device mounted on a steering wheel comprises a holding unit connected to a boss portion of the steering wheel. An inflater is held by the holding unit. The inflater includes a gas ejection portion. First and second fabrics have peripheral portions sewed together to constitute a bag structure. A gas inlet opening is formed in the first fabric. The gas inlet opening has the gas ejection portion of the inflater passed therethrough, so that the gas inlet opening is exposed to the interior of the bag structure. A third fabric is smaller in size than the first and second fabrics. The third fabric is installed in the bag structure in a manner to cover over the gas ejection portion of the inflater. A plurality of sewed points are provided by which the first and third fabrics are sewed together. A plurality of gas flow passages are provided between the first and third fabrics. Each gas flow passage is defined between neighboring two of the sewed points. A vent opening extends through one of the sewed points to provide a communication between a major portion of the interior of the bag structure and the outside of the same.

16 Claims, 7 Drawing Sheets

AIR BAG DEVICE

BACKGROUND OF THE INVENTION

1. Field of the Invention

The present invention relates in general to a passenger restraining device of a motor vehicle, and more particular to an air bag device mounted on a steering wheel for protecting a driver.

2. Description of the Prior Art

Hitherto, various air bag devices have been proposed and put into practical use. Some are of a type for a driver, that is mounted on a boss potion of a steering wheel. Upon a vehicle collision, gas is rushed into the air bag to instantly expand the same thereby to safely hold the upper half of the driver. Some of the air bags are of a type that comprises front and rear circular woven fabrics of Nylon (trade name) whose peripheries are sewed together. Thus, when applied with no gas, the air bag is shaped flat. The front fabric that faces the boss portion of the steering wheel is formed with a gas inlet opening, and a peripheral portion of the gas inlet opening is fixed to the boss portion of the steering wheel. An inflater is also mounted on the boss portion, which has a gas outlet connected to the gas inlet opening of the air bag. In not use, the air bag is kept folded small and housed in a container mounted on the boss portion. Upon a vehicle collision, a certain amount of gas is instantly ejected from the inflater to expand the air bag. During the expansion, the air bag breaks the container and gets out of the same and safely holds the upper half of the driver.

For much safely holding the driver even if he or she has been seated out of position with his or her upper half positioned very close to the steering wheel, Japanese Patent First Provisional Publication 7-149199 proposes a measure that forces the air bag to expand laterally flat. In this disclosed measure, a so-called gas guide fabric is installed in the air bag, by which the gas is guided to flow laterally outward. More specifically, within the air bag, there is installed a circular inner fabric as the gas guide fabric, that is arranged to cover over the gas inlet opening and has a peripheral portion sewed on spaced portions of the front circular woven fabric of the air bag. Upon gas generation, the gas is forced to flow through the sewed spaced portions. For discharging the gas from the air bag, vent openings are provided in the front circular woven fabric around the periphery of the circular inner fabric.

However, even the air bag device of the above-mentioned publication has failed to give users satisfaction. That is, due to its inherent construction, a larger amount of gas is discharged through the vent openings without contributing to expansion of the air bag. This brings about a need of increasing capacity and size of the inflater and lowering the air bag expansion speed. If, for solving this drawback, the vent openings are positioned away from the gas inlet opening, that is, near the periphery of the front circular woven fabric, a new drawback tends to occur. That is, in this case, at a final stage of the air bag expansion, the hot gas discharged from the vent openings may be directed toward the upper half of the driver. Thus, to cool the gas, additional measure becomes needed. Furthermore, due to the increased distance from the gas inlet opening to the vent openings, it becomes necessary to devise a new method of compactly folding the air bag for making it possible for the vent opening to serve properly as an inner pressure controlling means. Furthermore, if the circular inner fabric has a larger size, the rearward swelling of the same caused by rush of the gas through the gas inlet opening becomes remarkable, which affects the expansion characteristics of the air bag, and hence the pressure to be applied to the vehicle passenger.

SUMMARY OF THE INVENTION

It is therefore an object of the present invention to provide an air bag device which is free of the above-mentioned drawbacks.

According to a first aspect of the present invention, there is provided an air bag device. The air bag device comprises first and second fabrics having peripheral portions sewed together to constitute a bag structure; a gas inlet opening formed in the first fabric; a third fabric smaller in size than the first and second fabrics, the third fabric being installed in the bag structure in a manner to cover over the gas inlet opening; a plurality of sewed points by which the first and third fabrics are sewed together; a plurality of gas flow passages provided between the first and lo third fabrics, each gas flow passage being defined between neighboring two of the sewed points; and a vent opening that extends through at least one of the sewed points to provide a communication between a major portion of the interior of the bag structure and the outside of the same.

According to a second aspect of the present invention, there is provided an air bag device for use on a steering wheel having a boss portion. The air bag device comprises a holding unit connected to the boss portion of the steering wheel; an inflater held by the holding unit, the inflater including a gas ejection portion; first and second fabrics having peripheral portions sewed together to constitute a bag structure; a gas inlet opening formed in the first fabric, the gas inlet opening having the gas ejection portion of the inflater passed therethrough, so that the gas ejection portion is exposed to the interior of the bag structure; a third fabric smaller in size than the first and second fabrics, the third fabric being installed in the bag structure in a manner to cover over the gas ejection portion of the inflater; a plurality of sewed points by which the first and third fabrics are sewed together; a plurality of gas flow passages provided between the first and third fabrics, each gas flow passage being defined between neighboring two of the sewed points; and a vent opening that extends through at least one of the sewed points to provide a communication between a major portion of the interior of the bag structure and the outside of the same.

BRIEF DESCRIPTION OF THE DRAWINGS

Other objects and advantages of the present invention will become apparent from the following description when taken in conjunction with the accompanying drawings, in which.

DETAILED DESCRIPTION OF THE EMBODIMENTS

In the following, various embodiments of the present invention will be described with reference to the accompanying drawings. For ease of understanding, various directional terms, such as upper, lower, right, left, upward etc., will be used in the description. However, such terms are to be understood with respect to a drawing or drawings on which the corresponding part or portion is illustrated.

Figure 1:
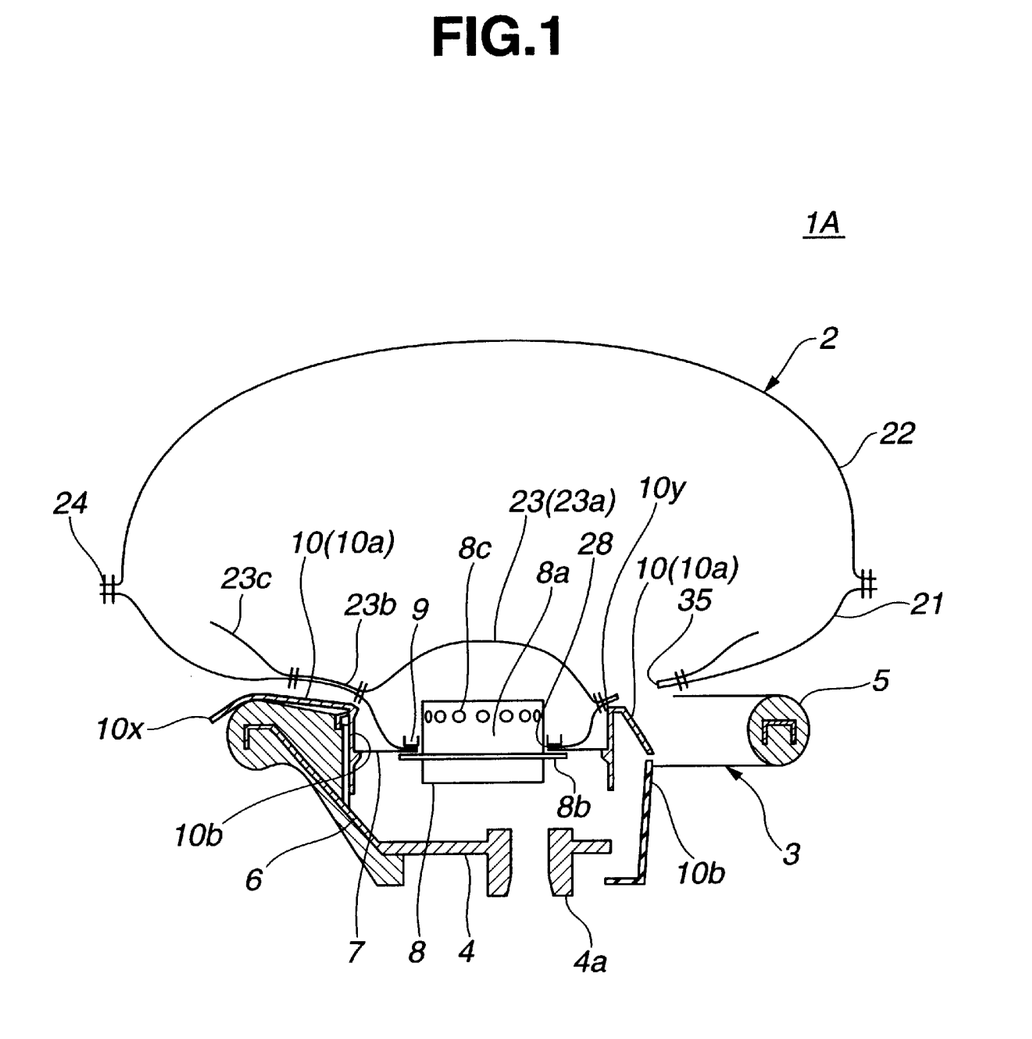
FIG. 1 is a schematically illustrated sectional view of an air bag device of a first embodiment of the present invention, showing an expanded condition of the air bag, this view being taken along the line I—I of FIG. 2.
Figure 2:
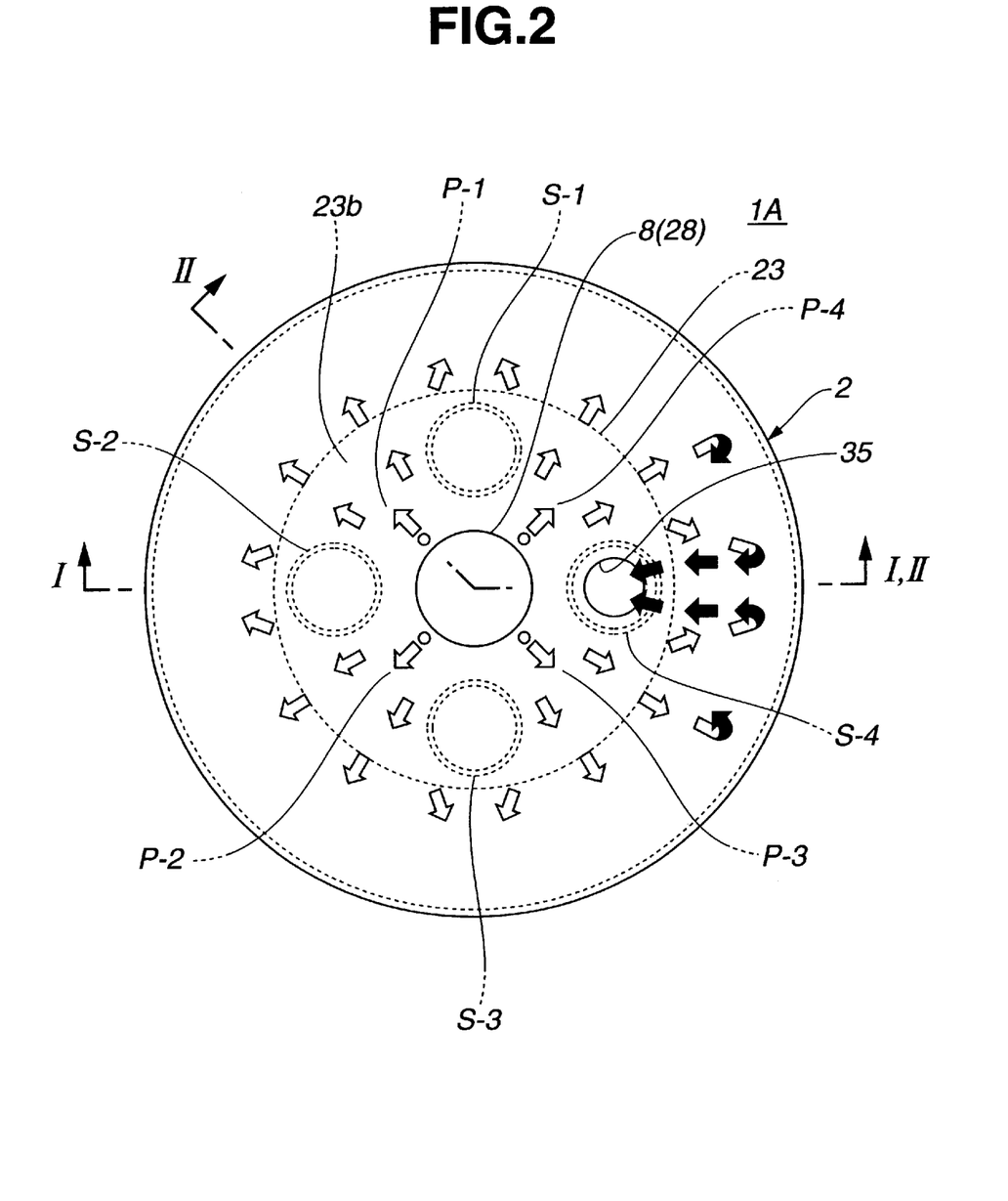
FIG. 2 is a bottom view of the air bag of FIG. 1.

Referring to FIGS. 1 and 2, there is shown an air bag device 1A of a first embodiment of the present invention. The air bag device 1A shown in these drawings shows an expanded condition of the air bag. Thus, a cover member 10 shown is in a broken condition.

As is seen from FIG. 1, the air bag device 1A is mounted on a boss portion 4 of a steering wheel 3 for protecting a driver D (see FIG. 3D) upon a vehicle collision. Although not shown in the drawing, the steering wheel 3 is connected to an upper end of a steering shaft which is inclined with respect to a vehicle floor.

The steering wheel 3 generally comprises the boss portion 4 which is connected to the steering shaft, an annular grip or rim portion 5 which extends around the boss portion 4 and a plurality of spokes 6 which extend between the boss portion and the rim portion 5. As shown in FIG. 1, the boss portion 4 has a socket portion 4a in which the upper end of the steering shaft is intimately and tightly put.

The air bag device 1A comprises an air bag 2 for protecting the driver D, a base plate 7 for supporting the air bag 2, an inflater 8 for producing gas, a retainer 9 for retaining the inflater 8 on the base plate 7 and a cover member 10 for covering the air bag 2 in a folded condition. As has been mentioned hereinabove, the cover member 10 shown in this drawing has been already broken due to expansion of the air bag 2.

The base plate 7 is produced by pressing a metal plate. The base plate 7 comprises a rectangular major portion and four side walls that project downward from four sides of the major portion. The major portion is formed with a circular opening for putting therein the inflater 8. A plurality of bolt holes (not shown) are formed in the major portion around the circular opening. The side walls of the base plate 7 are provided with connecting pieces that are connected to a core metal of the boss portion 4.

The inflater 8 comprises a cylinder body 8a which is put in the circular opening of the base plate 7 and an annular flange 8b which extends around the cylinder body 8a. The cylinder body 8a has therearound a plurality of gas ejection openings 8c. As shown, these gas ejection openings 8c are positioned above the flange 8b. Although not shown in the drawing, the annular flange 8b is formed with a plurality of bolt holes which are mated with the bolt holes of the base plate 7.

The retainer 9 comprises an annular plate and a plurality of bolts which- extend downward from the annular plate.

For retaining the inflater 8 on the base plate 7, the annular flange of the inflater 8 is put on the peripheral portion of the circular opening of the base plate 7 and position adjustment is so made that the bolt openings of the annular flange are mated with the corresponding bolt openings of the base plate 7 respectively. Then, the annular retainer 9 is put on the annular flange of the inflater 8 having the bolts inserted through the mated bolt openings respectively, and then, nuts (not shown) are tightly engaged with the bolts.

With this, the base plate 7, the inflater, 8 and the retainer 9 constitute an integrated unit which is fixed to the boss portion 4 of the steering wheel 3.

The cover member 10 is made of a molded plastic, and comprises a convex center portion 10a which covers the integrated unit, and a wall portion 10b which surrounds the integrated unit. As is understood from FIG. 1, the wall portion 10b is secured to the side walls of the base plate 7. For this securing, a retainer belt extending along the side walls of the base plate 7 and bolts and nuts are used. If desired, rivets may be used in place of the bolts and nuts.

Thus, between the convex center portion 10a of the cover member 10 and the base plate 7, there is defined a certain space for containing therein the folded air bag 2. Although not shown in the drawing, the convex center portion 10a of the cover member 10 is formed at its inner surface with a groove or tear line that is easily broken when pressed by the air bag 2 upon expansion of the same. In FIG. 1 that shows the expanded condition of the air bag 2, denoted by 10x and 10y are the portions where the tear line has been present.

The air bag 2 generally comprises a first circular fabric 21 which faces the steering wheel 3, a second circular fabric 22 which faces the interior of the vehicle and a smaller diameter third circular fabric 23 which is sewed on an inner surface of the first circular fabric 21. These three fabrics 21, 22 and 23 are woven fabrics of Nylon (trade name) and they are concentric with one another when properly assembled.

That is, peripheral portions 24 of the first and second circular fabrics 21 and 22 are sewed together. Thus, when applied with no gas, the air bag 2 is shaped flat.

The first circular fabric 21 is formed at its center portion with a gas inlet opening 28 into which an upper part of the inflater 8 is projected. Thus, the gas ejection openings 8c of the inflater 8 are exposed to the interior of the air bag 2. As will be described hereinafter, upon assembly, a peripheral portion of the gas inlet opening 28 is tightly put between the flange of the inflater 8 and the annular retainer 9.

The third circular fabric 23 serves as a gas guide means, and is smaller in size than the first and second circular fabrics 21 and 22. For example, the diameter of the third circular fabric 23 is slightly larger than ½ of that of the first circular fabric 21.

As shown in FIG. 1, the third circular fabric 23 comprises a center portion 23a which covers over the upper end of the inflater 8, an annular intermediate portion 23b which is sewed on the inner surface of the first circular fabric 21 and a peripheral portion 23c which is free from the first circular fabric 21.

It is now to be noted that, as is seen from FIG. 2, the annular intermediate portion 23b is sewed on the first circular fabric 21 by four circular points S-1, S-2, S-3 and S-4 which are arranged at equally spaced intervals in a manner to surround the inflater 8. As shown, each sewed circular point S-1, S-2, S-3 or S-4 is provided by making a double stitching on a circular portion, so that the space defined in the circular point is sealed from the surrounding.

That is, between the first and third circular fabrics 21 and 23, there are provided four gas flow passages P-1, P-2, P-3 and P-4, each being defined between two neighboring circular points, these are, S-1 and S-2, S-2 and S-3, S-3 and S-4, and S-4 and S-1. That is, upon ejection of gas from the inflater 8, the same is forced to flow in such a manner as is indicated by white arrows.

It is further to be noted that as is seen from FIG. 2, the circular point S-4 is formed with a vent opening 35 through which the interior of the air bag 2 is communicated with the outside of the same. It is to be noted that the vent opening 35 is not exposed to the gas flow passages P-3 and P-4, but exposed to the major portion of the interior of the air bag 2. In other words, the vent opening 35 is provided at a remote position from the gas ejection openings 8c of the inflater 8 with respect to a gas flow passage defined in the air bag 2.

If desired, two or more vent openings 35 may be provided in some of the circular points S-1, S-2, S-3 and S-4. Tests have revealed that the best result is obtained when the number of the vent openings 35 is two.

For assembling the air bag device 1A, the following steps take place.

First, the annular retainer 9 is put into the space between the first and third circular fabrics 21 and 23, and the bolts of the retainer 9 are inserted through the mated bolt openings of the flange of the inflater 8 and the base plate 7 having the peripheral portion of the gas inlet opening 28 of the first circular fabric 21 put between the retainer 9 and the flange of the inflater 8. Then, the nuts are engaged with the bolts for providing a unit that includes the air bag 2, the base plate 7, the inflater 8 and the retainer 9. Then, the air bag is folded into a small size and the cover member 10 is secured to the base plate 7 in a manner to cover the folded air bag 2.

Then, the unit with the cover member 10 is mounted to the boss portion 4 of the steering wheel 3 in the above-mentioned manner.

Upon a vehicle collision, the inflater 8 is energized to eject a certain amount of gas from the gas ejection openings 8c. Thus, the air bag 2 is instantly expanded to protect the driver D (see FIG. 3D). At an initial stage of the expansion, the cover member 10 is broken to allow full expansion of the air bag 2 instantly.

In the following, advantageous expansion manner of the air bag 2 will be described with reference to FIGS. 3A to 3D.

Figure 3A:
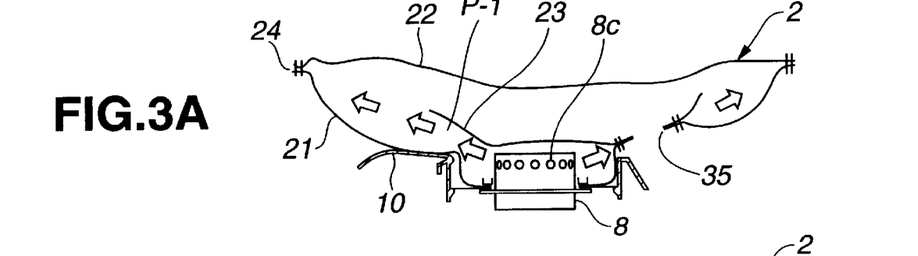
FIGS. 3A, 3B, 3C and 3D are sectional views taken along the line of II—II of FIG. 2, showing conditions of the air bag device which successively take place.

As is seen from FIG. 3A, at an initial stage of the gas ejection from the gas ejection openings 8c of the inflater 8, the gas is forced to flow radially outward under the third circular fabric 23. Thus, the third circular fabric 23 is somewhat swelled toward the driver D and at the same time the gas is led to the peripheral portion of the air bag 2 through the four gas flow passages P-1, P-2, P-3 and P-4 (see FIG. 2). In this initial stage, breakage of the cover member 10 is finished.

Figure 3B:
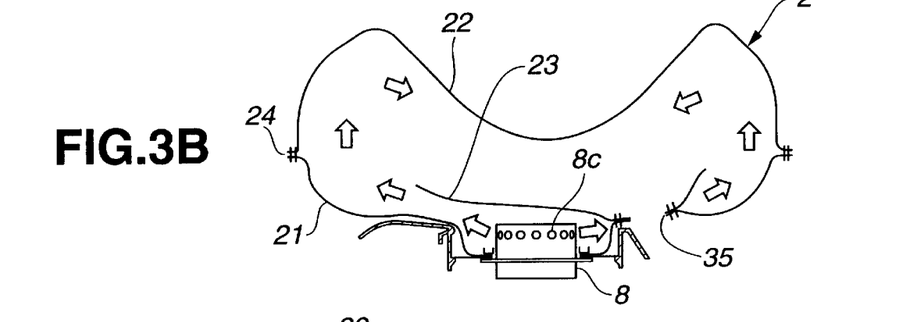

Then, as is seen from FIG. 3B, the gas is forced to change its traveling direction near the peripheral portion of the air bag 2. This change in traveling direction causes the peripheral portion of the air bag 2 to expand.

Figure 3C:
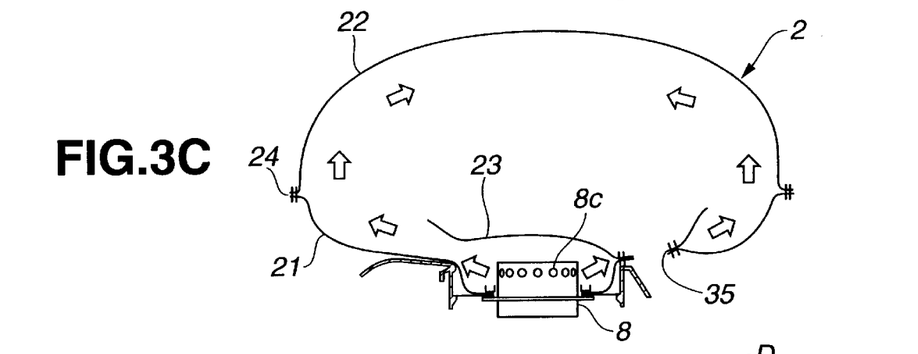

Then, as is seen from FIG. 3C, the gas is led to a center portion in the air bag 2, so that the air bag 2 is fully expanded to take a stand-by position for protecting the driver D.

Figure 3D:
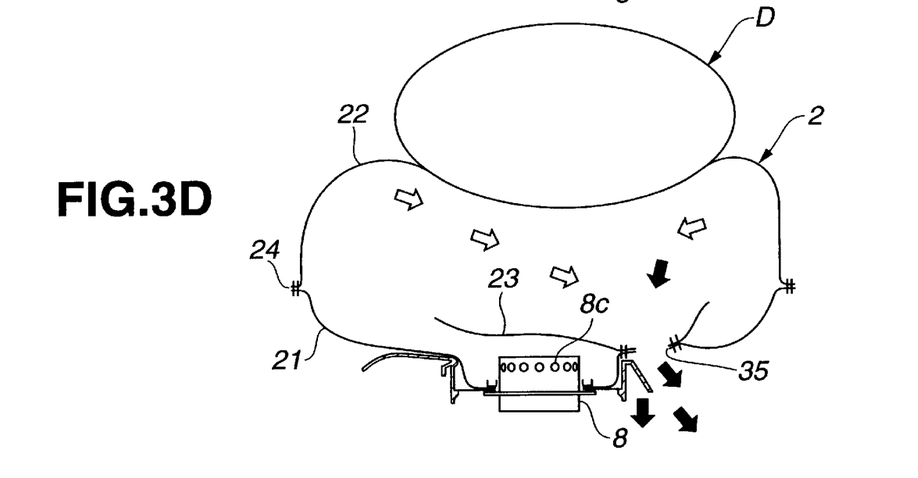

When, as is seen from FIG. 3D, the upper half of the driver D is rushed to the expanded air bag 2, a certain amount of gas is discharged to the outside through the vent opening 35 as is indicated by black arrows. With this, the driver D can be softly and safely supported by the air bag 2.

As is described hereinabove, due to provision of the third circular fabric 23 that serves as a gas guide means, expansion of the air bag 2 is carried out stepwise. That is, before the full expansion, the air bag 2 can take such a half-expanded condition as shown in FIG. 3B. This is very effective to protect a driver D who has been seated out of position with his or her upper half positioned very close to the steering wheel 3. That is, such expansion manner is very effective for safely receiving the driver D.

The expansion speed of the air bag 2 can be easily controlled or adjusted by only changing the number or size of the sewed points S-1, S-2, S-3 and S-4. Due to this change, the size of each gas flow passage P-1, P-2, P-3 or P-4 is changed.

Since the second circular fabric 22 that faces toward the driver D is free from the third circular fabric 23, the fabric 22 can expand largely in an axial direction, which increases the driver protecting ability of the air bag 2.

Since the vent opening 35 is provided at a remote position from the gas ejection openings 8c of the inflater 8, the gas from the gas ejection openings 8c is effectively used for expanding the air bag 2. If the vent opening 35 is positioned near the gas ejection openings 8c, remarked loss of air tends to occur.

Since the vent opening 35 is provided in the first circular fabric 21 that faces toward the steering wheel 3, the driver D is away from the gas discharged from the vent opening 35.

Due to provision of the third circular fabric 23, relatively long travelling passages for the gas are provided in the air bag 2. Thus, the high temperature gas from the inflater 8 can be sufficiently cooled during traveling in the passages until it is discharged through the vent opening 35. This means that a low cost type can be used as the inflater 8.

Because of usage of a smaller diameter fabric as the third circular fabric 23, the usage does not bring about substantial drawbacks on the size and weight of the air bag 2 and the easiness with which the air bag 2 is folded. Furthermore, for the same reason, the cost of the air bag device 1A can be reduced.

Since the vent opening 35 is provided in the circular point S-4 that serves to connect the first and third circular fabrics 21 and 23, compact and simplified structure of the air bag 2 is obtained.

Since the gas flow passages P-1, P-2, P-3 and P-4 defined between the first and third circular fabrics 21 and 23 have each a convexly curved entrance (see FIG. 2), gas flow into the passages P-1, P-2, P-3 and P-4 is smoothly carried out, which brings about a speedy and assured expansion of the air bag 2.

Figure 4:
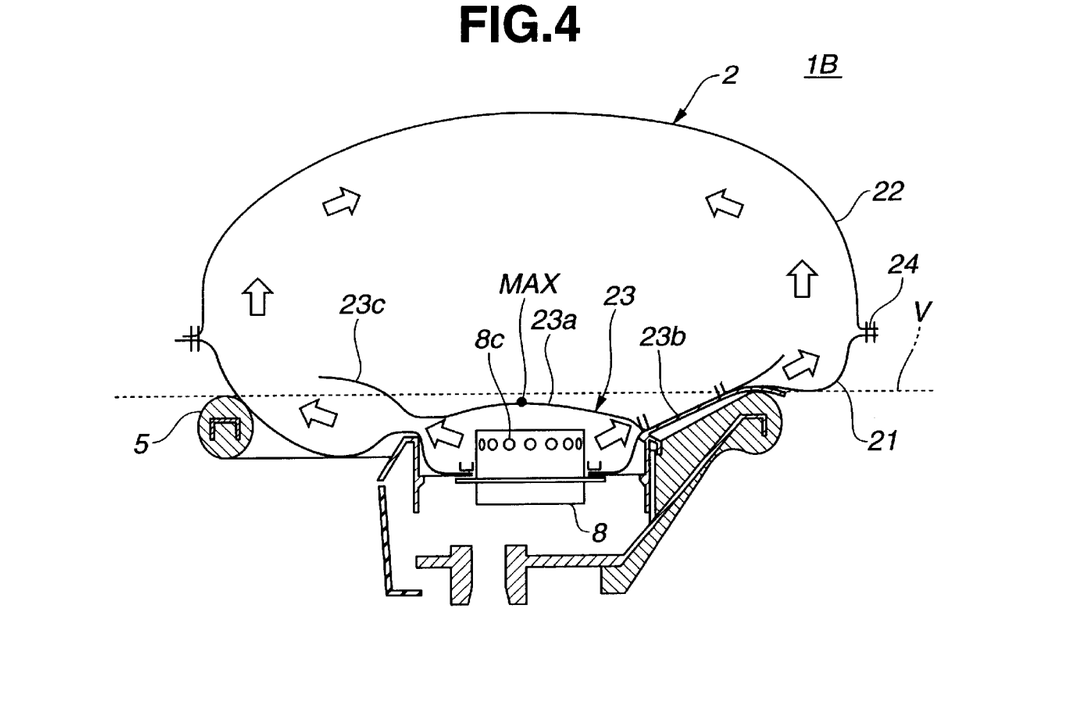
FIG. 4 is a view similar to FIG. 1, but showing a second embodiment of the present invention.

Referring to FIG. 4, there is shown an air bag device 1B of a second embodiment of the present invention.

Since the air bag device 1B of this second embodiment is similar to the air bag device 1A, only portions that are different from those of the first embodiment will be described.

In the second embodiment 1B, a measure is further employed wherein a maximally swelled part "MAX" of the center portion 23a of the third circular fabric 23 is controlled below an imaginary plane "V" that is defined by an upper surface of the rim portion 5 of the steering wheel 3. This measure is embodied by changing or adjusting the position of the sewed circular points S-1, S-2, S-3 and S-4. With this measure, the driver D who has been seated with his or her upper half positioned very close to the steering wheel 3 is much safely protected by the air bag 2.

Figure 5:
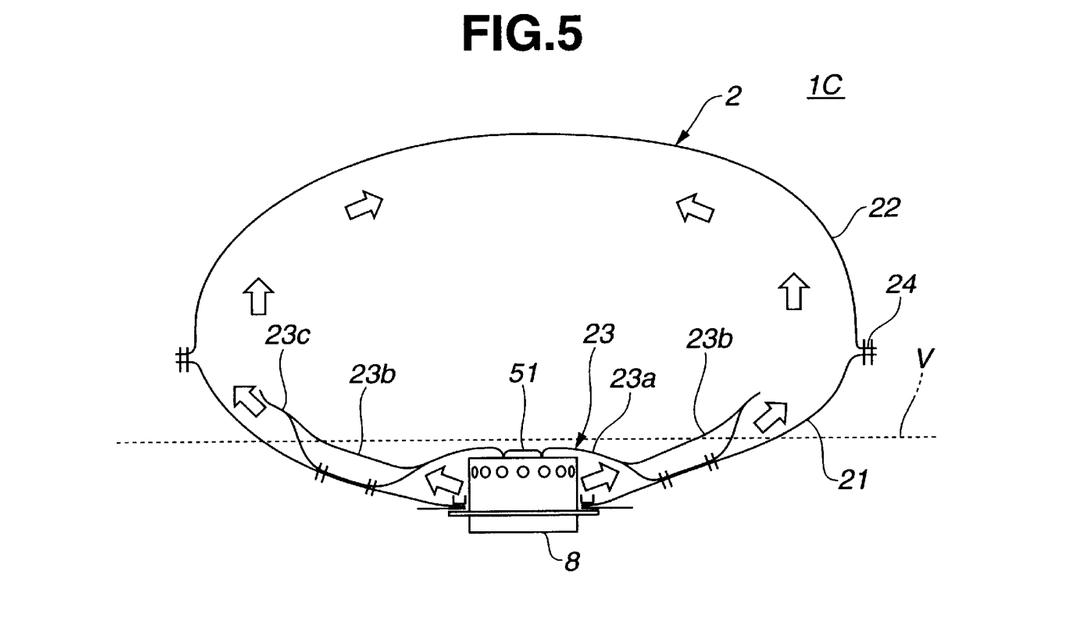
FIG. 5 is a view similar to FIG. 1, but showing a third embodiment of the present invention.

Referring to FIG. 5, there is shown an air bag device 1C of a third embodiment of the present invention.

In this embodiment, the top of the center portion 23a of the third circular fabric 23 is fixed to the top of the inflater 8 by means of a connector 51. With this connector 51, substantially same effect as that of the above-mentioned second embodiment 1B is obtained. That is, the swelling of the center portion 23a of the third circular fabric 23 is restricted not to extend beyond the imaginary plane "V".

Figure 6:
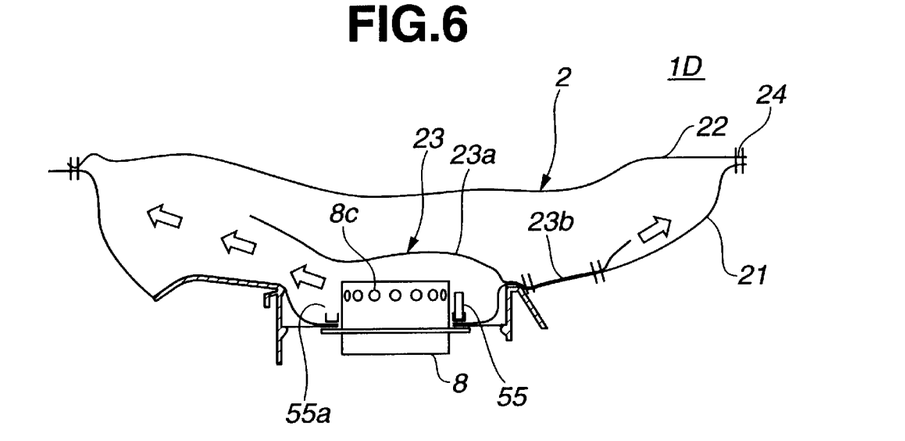
FIG. 6 is a sectional view of an air bag device of a fourth embodiment of the invention, this view being taken along the line VI—VI of FIG. 7.
Figure 7:
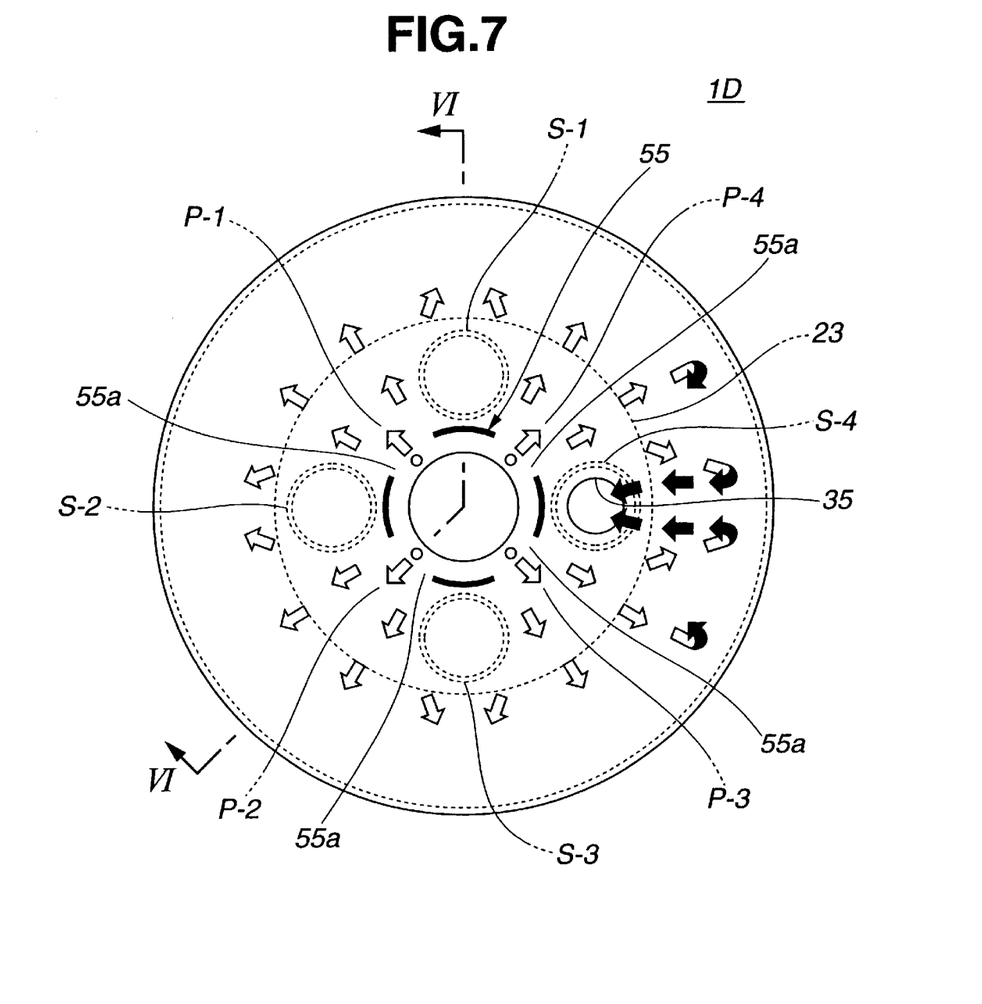
FIG. 7 is a bottom view of the air bag of FIG. 6.

Referring to FIGS. 6 and 7, there is shown an air bag device 1D of a fourth embodiment of the present invention.

In this embodiment, an annular baffle plate 55 is employed, which is arranged to surround the inflater 8. As is well seen from FIG. 7, the baffle plate 55 is formed with gas guide slots 55a through which the gas from the inflater 8 is guided to the gas flow passages P-1, P-2, P-3 and P-4. With this baffle plate 55, the gas flow toward the gas flow passages is rectified.

Figure 8:
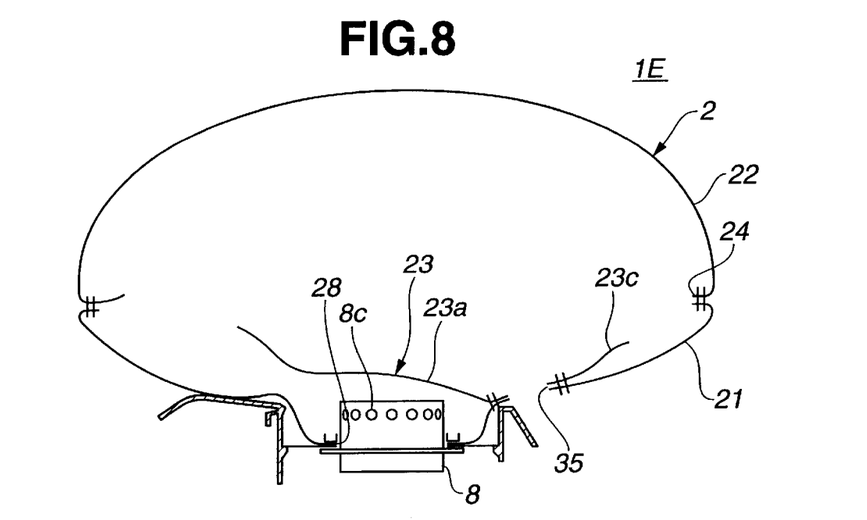
FIG. 8 is a view similar to FIG. 1, but showing a fifth embodiment of the present invention.

Referring to FIG. 8, there is shown an air bag device 1E of a fifth embodiment of the present invention.

In this embodiment, the sewed peripheral portions 24 of the air bag 2 are placed inside of the air bag 2. By turning the air bag 2 inside out through the gas inlet opening 28 of the first, circular fabric 21, this embodiment is established.

Figure 9:
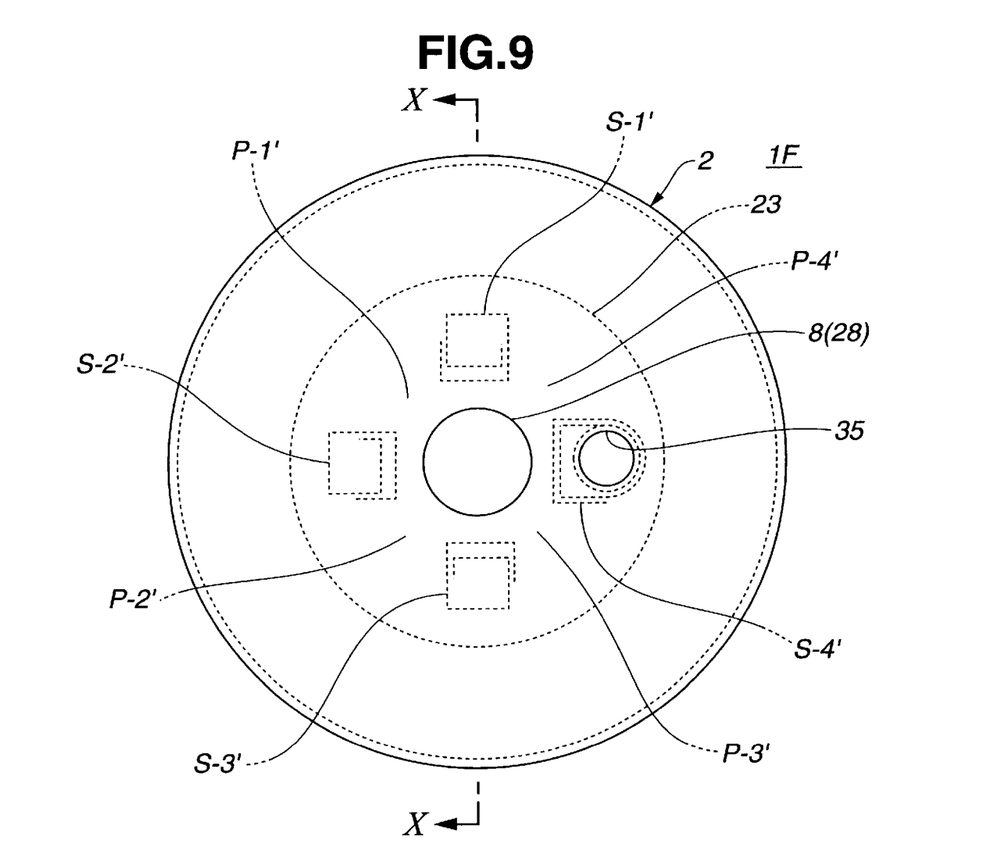
FIG. 9 is a bottom view of an air bag device of a sixth embodiment of the present invention.
Figure 10:
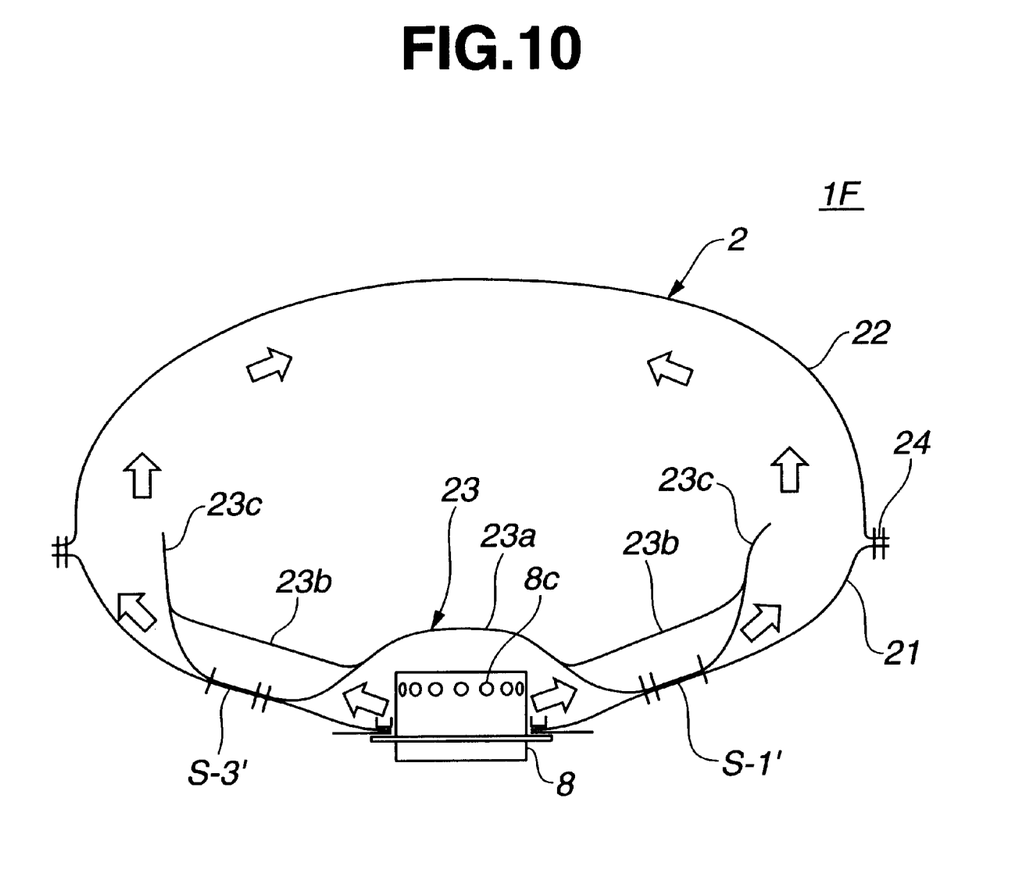
FIG. 10 is a sectional view taken along the line X—X of FIG. 9.

Referring to FIGS. 9 and 10, there is shown an air bag device 1F of a sixth embodiment of the present invention.

In this embodiment, in place of the circular points S-1, S-2, S-3 and S-4, four rectangular points S-1', S-2', S-3' and S-4' are employed through which the first and third circular fabrics 21 and 23 are sewed. As is understood from FIG. 9, each rectangular point S-1', S-2', S-3' or S-4' is provided by making a stitching along a rectangular path in a single stroke manner. However, only the point S-4' includes a semicircular stitched part that surrounds the vent opening 35.

In the following, modifications of the present invention will be described.

If desired, two or more vent openings may be provided depending on the air bag expansion speed needed. That is, small vent openings may be provided in the first circular fabric 21 near the boss portion 4 of the steering wheel 3.

Although the above description is directed to the air bag device which is to be mounted on the steering wheel 3, the air bag device may be mounted on other portions, such as an instrument panel for protecting a front seat passenger, a portion along a side door for protecting a side body of the passenger, a back of a back rest of a front seat for protecting a rear seat passenger and the like.

The entire contents of Japanese Patent Application 11-280790 (filed Sep. 30, 1999) are incorporated herein by reference.

Although the invention has been described above with reference to the six embodiments of the invention, the invention is not limited to such embodiments as described above. Various modifications and variations of such embodiments may be carried out by those skilled in the art, in light of the above descriptions.

What is claimed is:

1. An air bag device comprising:

first and second fabrics having peripheral portions sewed together to constitute a bag structure;

a gas inlet opening formed in said first fabric;

a third fabric smaller in size than said first and second fabrics and comprising a peripheral portion, said third fabric being installed in said bag structure in a manner to cover over said gas inlet opening and said peripheral portion being free from said first and second fabrics;

a plurality of sewed points by which said first and third fabrics are sewed together, each sewed point being provided by sewing radially intermediate portions of said first and third fabrics respectively;

a plurality of gas flow passages provided between said first and third fabrics, each gas flow passage being defined between neighboring two of said sewed points; and a vent opening that is provided in and through at least one of said sewed points to provide a communication between a portion of the interior of said bag structure, which is defined between said second and third fabrics and the outside of said bag structure.

2. An air bag device as claimed in claim 1, in which each of said gas low passages has a convexly curved entrance to smooth the gas flow therethrough.

3. An air bag device as claimed in claim 2, in which each of said sewed points is circular in shape.

4. An air bag device as claimed in claim 2, in which said convexly curved entrance is shaped like an arch.

5. An air bag device as claimed in claim 1, in which each of said sewed points is rectangular in shape, each sewed point being provided by making a stitching along a rectangular path in a single stroke manner.

6. An air bag device as claimed as claim 1, in which said third fabric comprises:

a center portion which covers said gas inlet opening; and an annular intermediate portion which is connected to said first fabric through said sewed points.

7. An air bag device as claimed in claim 6, further comprising an excessive swelling suppressing means by which excessive swelling of said third fabric in said bag structure is suppressed.

8. An air bag device as claimed in claim 6, further comprising a gas flow rectifying member which is arranged between said gas inlet opening and each of said gas flow passages to rectify the gas flow from said gas inlet opening toward said gas flow passages.

9. An air bag device as claimed in claim 1, in which said first, second and third fabrics are circular in shape and concentrically arranged.

10. An air bag device for use on a steering wheel having a boss portion, comprising:

- a holding unit connected to said boss portion of said steering wheel;
- an inflater held by said holding unit, said inflater including a gas ejection portion;
- first and second fabrics having peripheral portions sewed together to constitute a bag structure;
- a gas inlet opening formed in said first fabric, said gas inlet opening having said gas ejection portion of said inflater received therein, so that said gas ejection portion is exposed to the interior of said bag structure;
- a third fabric smaller in size than said first and second fabrics and comprising a peripheral portion, said third fabric being installed in said bag structure in a manner to cover over the gas ejection portion of said inflater and said peripheral portion being free from said first and second fabrics;
- a plurality of sewed points by which said first and third fabrics are sewed together, each sewed point being provided by sewing radially intermediate portions of said first and third fabrics respectively;
- a plurality of gas flow passages provided between said first and third fabrics, each gas flow passage being defined between neighboring two of said sewed points; and
- a vent opening that is provided in and through at least one of said sewed points to provide a communication between a portion of the interior of the bag structure, which is defined between said second and third fabrics and the outside of the bag structure.

11. An air bag device as claimed in claim 10, in which each of said gas flow passages has a convexly curved entrance to smooth the gas flow therethrough.

12. An air bag as claimed in claim 10, in which each said sewed points is rectangular in shape, each sewed point being provided by making a stitching along a rectangular path in a single stroke manner.

13. An air bag device as claimed in claim 12, further comprising a swelling restricting means by which a maximally swelled part of said center portion of said third fabric is controlled below an imaginary plane that is defined by an upper surface of a rim portion of said steering wheel.

14. An air bag device as claimed in claim 13, in which said swelling restricting means is a connector by which a top of the center portion of said third fabric is fixed to a top of said inflater.

15. An air bag device as claimed in claim 10, in which said third fabric comprises:

- a center portion which covers over said gas ejection portion of said inflater; and
- an annular intermediate portion which is connected to first fabric through said sewed points.

16. An air bag device as claimed in claim 10, further comprising an annular baffle plate which is arranged to surround said inflater, said baffle plate being formed with a plurality of gas guide slots through which the gas from the gas ejection portion of said inflater is guided to the gas flow passage.

* * * * *